(12) United States Patent
Nadeau

(10) Patent No.: US 12,163,331 B2
(45) Date of Patent: Dec. 10, 2024

(54) DISASSEMBLABLE ROOF FRAMING STRUCTURE FOR USE ON CAMPING TRAILERS, MOTOR-HOMES AND THE LIKES

(71) Applicant: Daniel Nadeau, Lac-des-Ecorces (CA)

(72) Inventor: Daniel Nadeau, Lac-des-Ecorces (CA)

( * ) Notice: Subject to any disclaimer, the term of this patent is extended or adjusted under 35 U.S.C. 154(b) by 0 days.

(21) Appl. No.: 17/367,477

(22) Filed: Jul. 5, 2021

(65) Prior Publication Data

US 2023/0003020 A1    Jan. 5, 2023

(51) Int. Cl.
  *E04B 7/02*   (2006.01)
  *B60P 3/32*   (2006.01)

(52) U.S. Cl.
  CPC ........... *E04B 7/022* (2013.01); *B60P 3/32* (2013.01)

(58) Field of Classification Search
  CPC .... B60P 3/32; B60P 3/34; B60P 3/341; B60P 3/343; B60P 3/36; B60P 3/38; B60P 3/39; B60P 3/40; B60P 3/41; E04B 7/022; E04B 7/02
  USPC ......... 296/156, 159, 161, 165; 52/92.2, 713, 52/715
  See application file for complete search history.

(56) References Cited

U.S. PATENT DOCUMENTS

| | | | |
|---|---|---|---|
| 1,696,113 A * | 12/1928 | Gilkison | B60P 3/341 |
| | | | 296/170 |
| 2,365,579 A | 12/1944 | Mulligan | |
| 2,990,588 A | 7/1961 | McKinley | |
| 3,879,050 A | 4/1975 | Young | |
| 3,900,182 A * | 8/1975 | Berman | E04G 17/18 |
| | | | 249/24 |
| 4,592,186 A * | 6/1986 | Braginetz | E04B 1/2604 |
| | | | 52/715 |
| 4,863,189 A | 9/1989 | Lindsay | |
| 5,303,520 A * | 4/1994 | Gozdziak | E04C 3/17 |
| | | | 52/713 |
| 5,467,569 A * | 11/1995 | Chiodo | E04B 7/00 |
| | | | 52/297 |
| 6,035,590 A | 3/2000 | Lindsay | |
| 6,044,610 A | 4/2000 | DeVon et al. | |
| 6,324,750 B1 | 12/2001 | Saunders et al. | |
| 6,457,291 B2 | 10/2002 | Wick | |
| 6,668,496 B1 | 12/2003 | Clapp et al. | |
| 7,021,694 B1 * | 4/2006 | Roberts | B60P 3/39 |
| | | | 5/118 |

(Continued)

*Primary Examiner* — Brent W Herring

(57) ABSTRACT

A disassemblable roof framing structure for use on camping habitations comprising structural attachment brackets for connecting a transverse beam with an existing frame on the habitation. The attachment brackets are adjustable widthwise by sliding along the length of the transverse beam so as to adjust to the width of the habitation. The transverse beam has one extension member for each end of the transverse beam. The extension members being extendable so as to adjust to the width of the existing frame. The extension members have attachment brackets at their distal ends from which perpendicularly extend vertical studs running upwardly along the side walls of the habitation and up towards the roof of the habitation. Each vertical stud is capped by an interface bracket, and each interface bracket connects to a top beam. There is at least one top beam on each side of the habitation to which are connected triangular rafter frames by way of rafter connector brackets.

5 Claims, 5 Drawing Sheets

(56) References Cited

U.S. PATENT DOCUMENTS

| | | | |
|---|---|---|---|
| 8,839,588 B2* | 9/2014 | Philbin | E04B 1/38 |
| | | | 52/715 |
| 2001/0047634 A1 | 12/2001 | Wick | |
| 2002/0116893 A1* | 8/2002 | Waldrop | E04B 2/7818 |
| | | | 52/843 |
| 2007/0010740 A1 | 7/2007 | Franco | |
| 2021/0371016 A1* | 12/2021 | Luchini | B62D 33/0207 |

* cited by examiner

DISASSEMBLABLE ROOF FRAMING STRUCTURE FOR USE ON CAMPING TRAILERS, MOTOR-HOMES AND THE LIKES

CROSS-REFERENCE TO RELATED APPLICATIONS

The present application claims priority to UK request for patent number GB2010453.5, filed on Jul. 7, 2020 entitled "Dismantlable roof framing structure for use on camping trailers and motor-homes", the disclosure of which is hereby incorporated in its entirety at least by reference.

BACKGROUND OF THE INVENTION

1. Field of the Invention

The present invention relates generally to camping trailer equipment but more particularly to a disassemblable roof framing structure for use on camping trailers, motor-homes and the likes.

2. Description of Related Art

Over time, camping trailers can develop roof leaks. The main reason they do is because their roof is flat so water can settle in and find its way through cracks in the joints between metal sheets making up the outer skin of the trailer. Some owners of trailers who stay in one place for the season take the time to install a makeshift sloping roof. Others build more elaborate structures that make the trailer look as if it is inside a hanger. Some of those structures are not so pretty and some campgrounds simply won't allow them to be built because they don't make the campground look good.

BRIEF SUMMARY OF THE INVENTION

It is a main object of the present disclosure to provide for a disassemblable roof framing structure for use on camping trailers and motor-homes, and the likes.

In order to do so, there is provided a disassemblable roof framing structure for use on camping habitations comprising structural attachment brackets for connecting a transverse beam with an existing frame on the habitation. The attachment brackets are adjustable width-wise by sliding along the length of the transverse beam so as to adjust to the width of the habitation. The transverse beam has one extension member for each end of the transverse beam. The extension members being extendable so as to adjust to the width of the existing frame. The extension members have attachment brackets at their distal ends from which perpendicularly extend vertical studs running upwardly along the side walls of the habitation and up towards the roof of the habitation. Each vertical stud is capped by an interface bracket, and each interface bracket connects to a top beam. There is at least one top beam on each side of the habitation to which are connected triangular rafter frames by way of rafter connector brackets.

In a preferred embodiment, the attachment brackets are comprised of a bottom cover, top cover, and an existing frame connecting plate mechanically fastened to the frame. The top and bottom covers clasp the sides of the transverse beam by being mechanically fastened to each other by way of lag bolts.

In yet another preferred embodiment, the rafter frames consist in generally scalene triangular shapes so as to impart a slope on two sides of the roof wherein one side is longer than the other.

In still another embodiment the frame connecting plate is further comprised of a pair of oppositely placed connector members holding by compression a connection bracket.

The disassemblable roof framing structure has a method of assembly consisting in the step of:
a) connecting the existing frame connecting plate to the top cover;
b) connecting the existing frame connecting plate to the existing frame;
c) using the bottom cover and the lag bolts to connect the transverse beam to the existing frame;
d) extending the extension members to adjust the width and placing studs into the attachment brackets;
e) connecting interface brackets to the top of the studs;
f) connecting the interface brackets to the top beam;
g) connecting the rafter connector brackets to the top beam and the rafter frames; and
h) putting a tarp over the rafter frames.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein.

Figure 1:
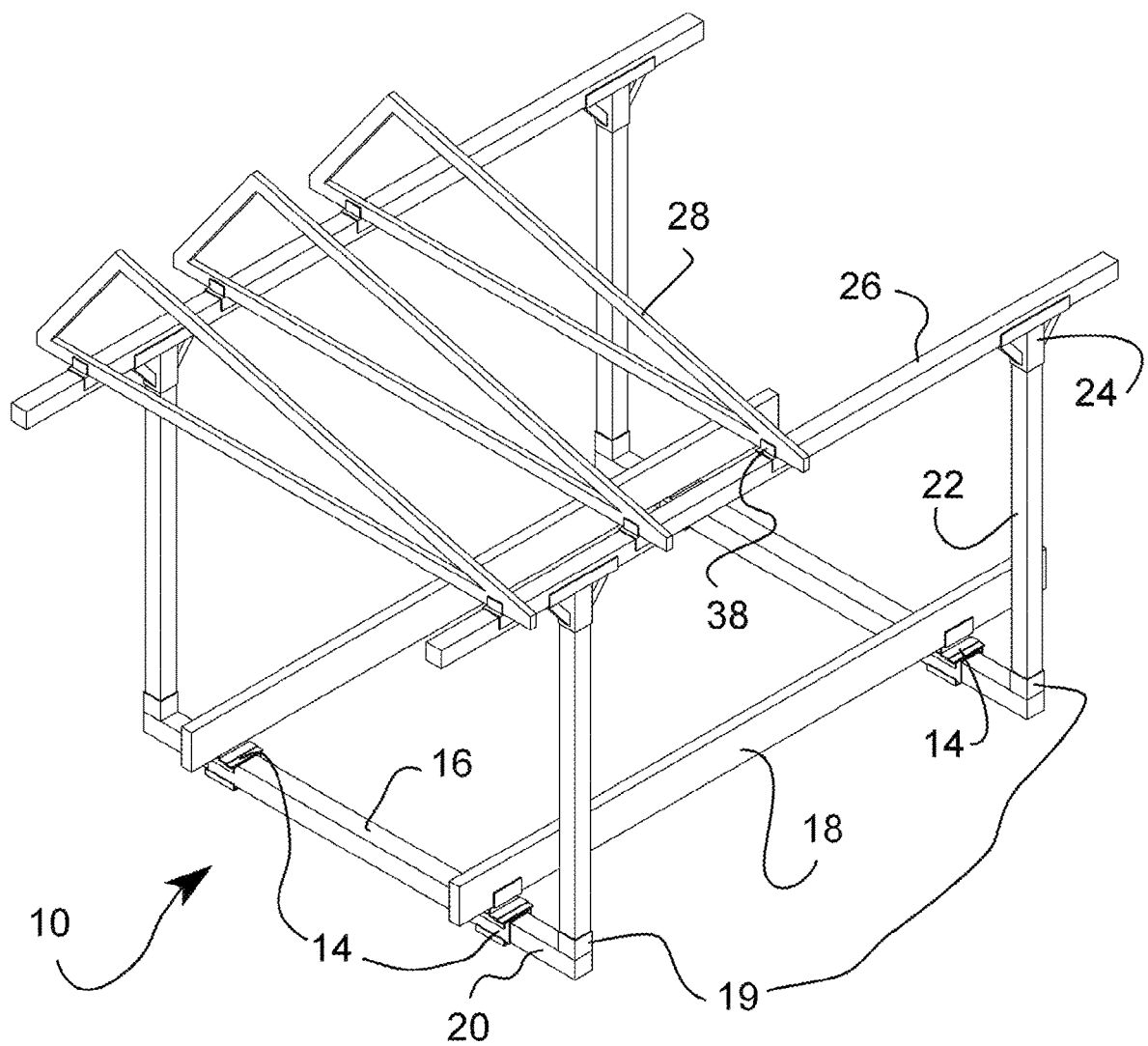
FIG. 1 is an isometric view of an embodiment of the invention, according to an embodiment of the present invention.

Referring now to FIGS. 1, 4-6, there is provided a disassemblable roof framing structure (10) for use on most types of camper habitations (12) such as trailers, fifth wheels and motor homes, for example. The structure (10) is comprised of structural attachment brackets (14) for connecting a transverse beam (16) with an existing frame (18) on the habitation (12). At each end of the transverse beam (16) is an extension member (20), one for each end of the transverse beam (16). The extension members (20) adjust to the width of the habitation (12) by extending out of the transverse beam (16). The attachment brackets (14) adjust to the width of the existing frame (18) by sliding along the length of the transverse beam (16) and then being tightened thereto. The extension members (18), have attachment brackets (19) at their distal ends from which perpendicularly extend vertical studs (22) that run upwardly along the side walls of the habitation and up towards the roof. Each stud (22) is capped by an interface bracket (24). As seen in FIG. 1, which shows a non limiting example, each of the two sets of interface bracket pairs (24) takes on one top beam (26) for a total of two top beams (26), one for each longitudinal side of the habitation (12). On each top beam (26) are attached triangular rafter frames (28), and rafter connector brackets (38). Once this is done, a simple tarpaulin (not shown) can be fitted over the structure (10).

Figure 2:
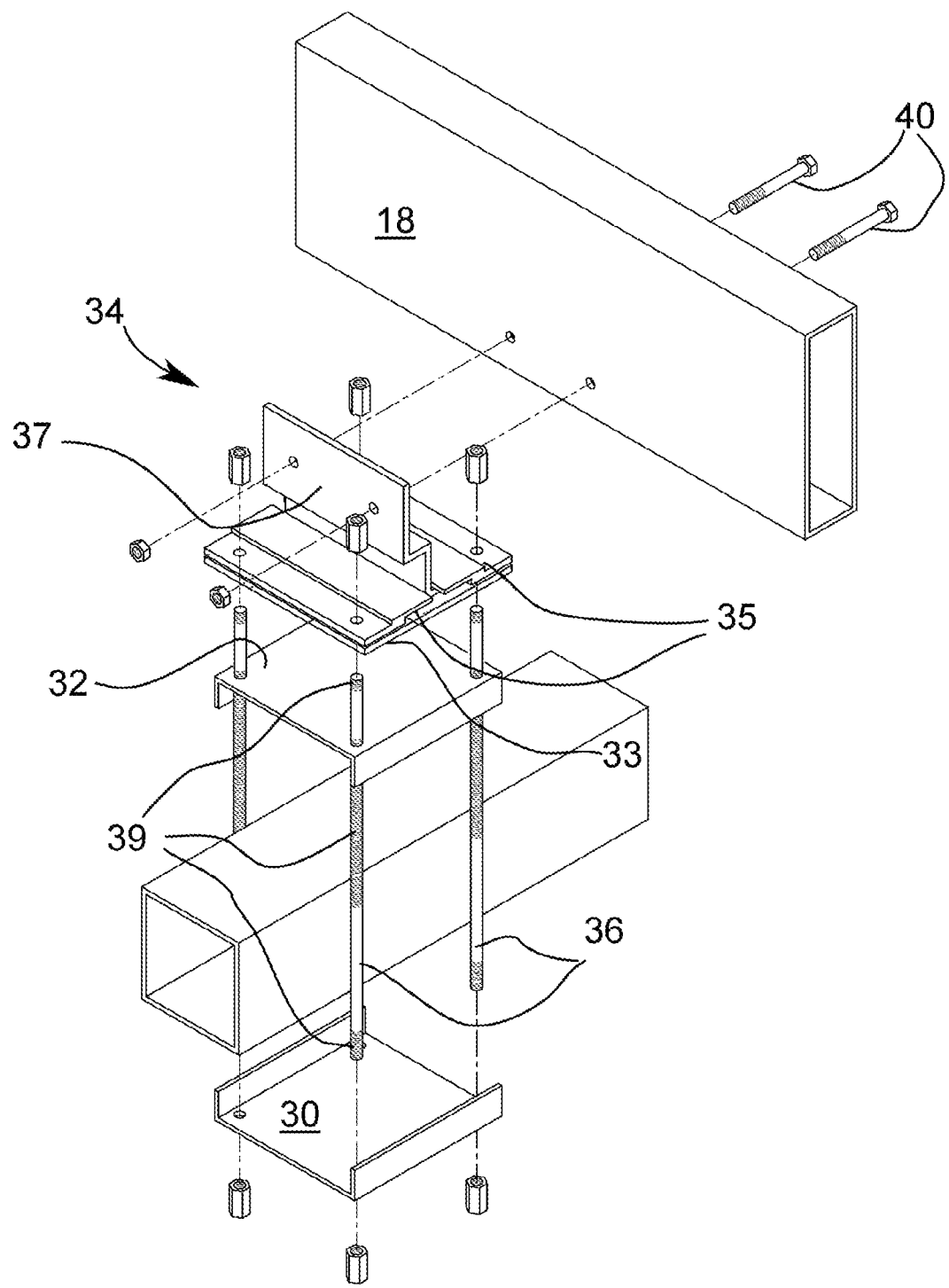
FIG. 2 is an exploded view of the attachment bracket, according to an embodiment of the present invention.
Figure 3:
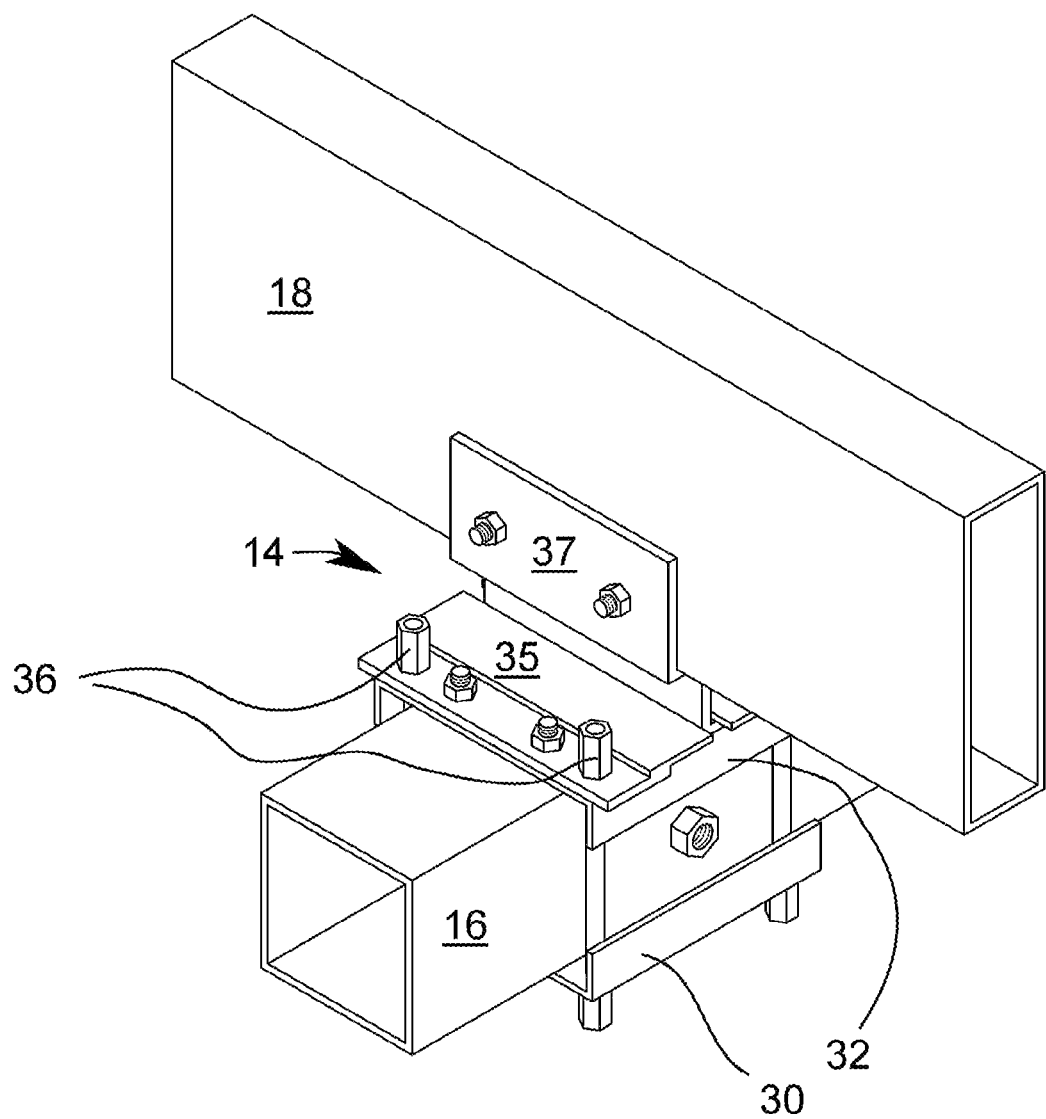
FIG. 3 is an isometric view of the attachment bracket, according to an embodiment of the present invention.
Figure 4:
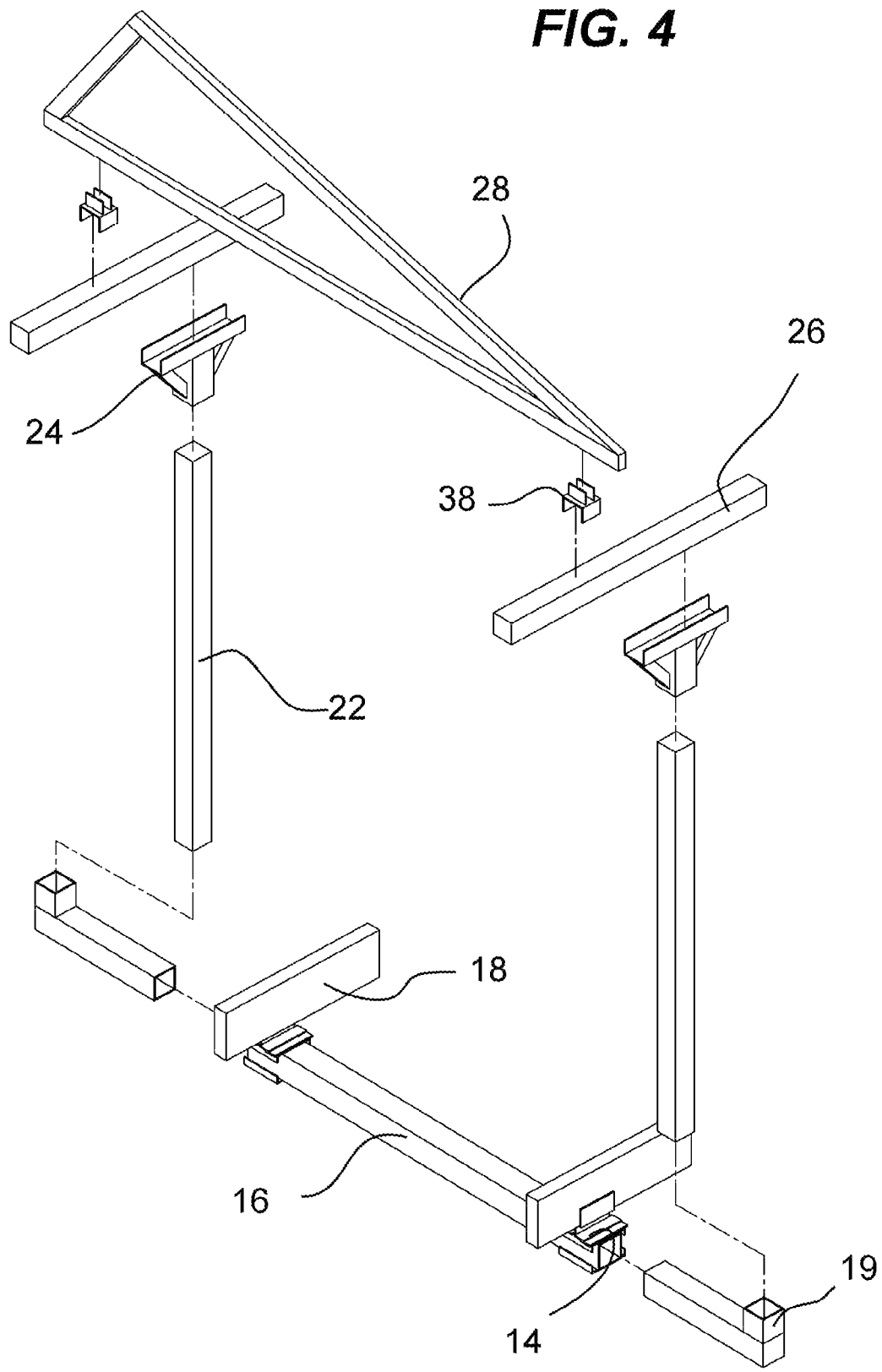
FIG. 4 is an exploded view of one section of the invention, according to an embodiment of the present invention.
Figure 5:
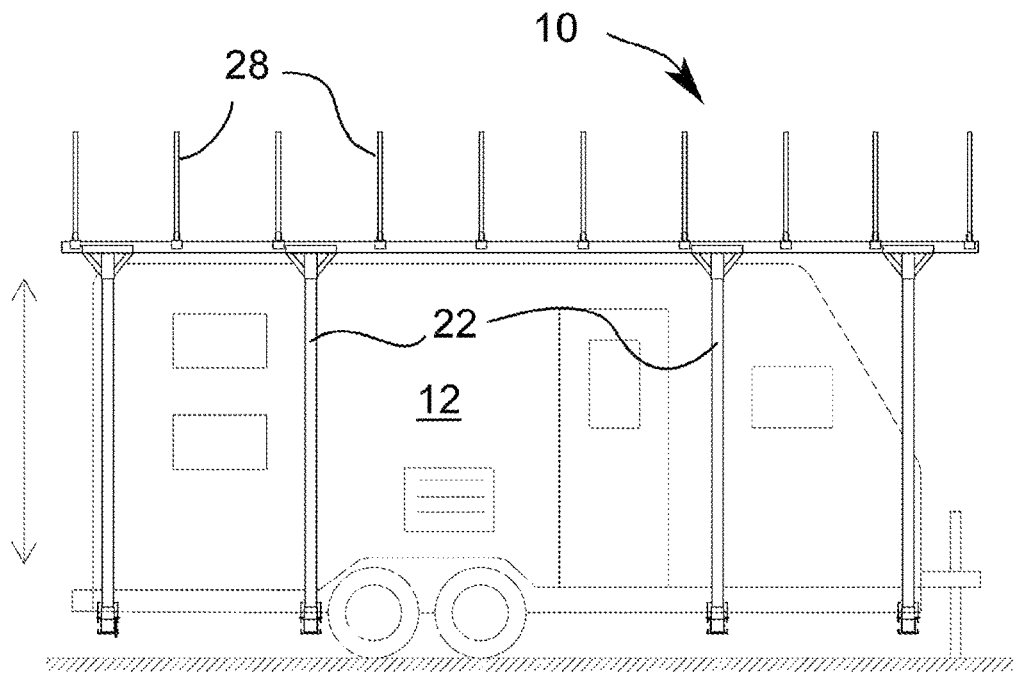
FIG. 5 is a front view of the invention installed on a habitation, according to an embodiment of the present invention.

As best seen in FIGS. 2-3, the attachment brackets (14) are comprised of a bottom cover (30), a top cover (32) and an existing frame connecting plate (34) which is mechanically fastened to the frame (18). The bottom and top covers (30, 32) sandwich the transverse beam (16) by being mechanically fastened to each other by way of lag bolts (36). Regular mechanical fasteners (40) take care of the rest of the mechanical fastening as known in the art.

The frame connecting plate (34) is itself further comprised of a pair of oppositely placed connector members (35) that hold by compression a connection bracket (37). Illustrated in FIG. 2 is a 1 sided bracket but a "U" shaped bracket (not shown) clasping both sides of the existing frame (18) could be used and other shaped brackets could be used without departing from the scope of the invention.

Figure 6:
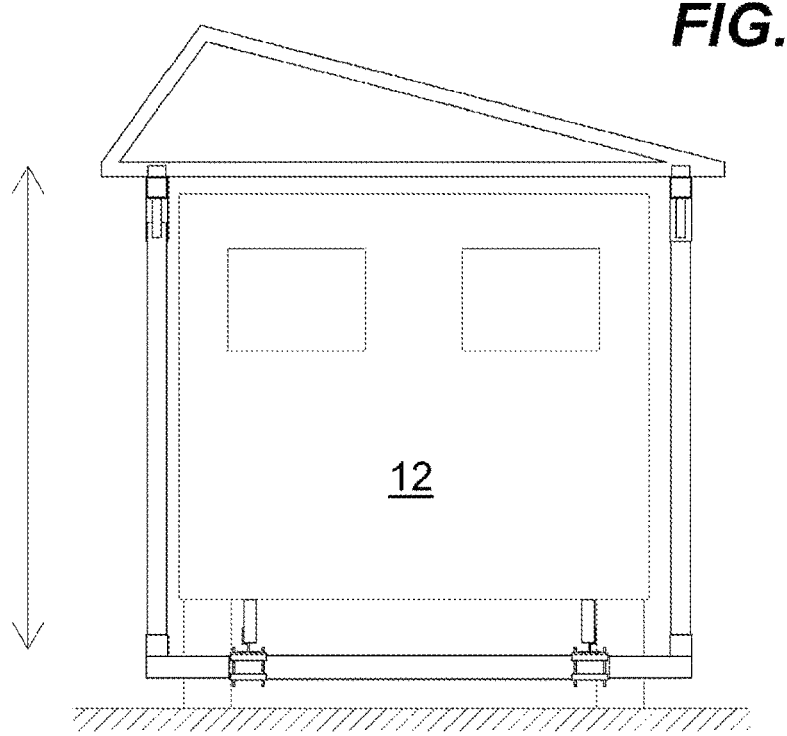
FIG. 6 is a side view of the invention installed on a habitation according to an embodiment of the present invention.

As seen in FIG. 6, the rafter frames (28) consist in generally scalene triangular shapes so as to give a nice slope on two sides of the roof wherein one side is longer than the other. The shape can be extended so that the overhang can act as a roof over a patio.

The disassemblable roof framing structure (10) has a method of assembly consisting in the step of:
 a) connecting the existing frame connecting plate (34) to the top cover (32);
 b) connecting the existing frame connecting plate (34) to the existing frame (18);
 c) using the bottom cover (30) and the lag bolts (36) to connect the transverse beam (16) to the existing frame (18);
 d) extending the extension members (20) to adjust the width and placing studs (22) into the attachment brackets (19);
 e) connecting interface brackets (24) to the top of the studs (22);
 f) connecting the interface brackets (24) to the top beam (26);
 g) connecting the rafter connector brackets (38) to the top beam (26) and the rafter frames (28);
 h) putting a tarp over the rafter frames (28).

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A disassemblable roof framing structure for use on a camping habitation having a roof, the structure comprising:
 a plurality of structural attachment brackets for connecting a transverse beam of the structure with an existing frame on the camping habitation the transverse beam having a first end and a second end opposite the first end;
 the plurality of structural attachment brackets being adjustable width-wise by sliding along a length of the transverse beam so as to adjust to a width of the camping habitation;
 an extension member at the first end and the second end of the transverse beam, each of the extension members being extendable so as to adjust to the width of the existing frame;
 each of the extension members has a respective one of the attachment brackets from which extends a vertical stud towards the roof of the camping habitation;
 each of the vertical studs being capped by a respective interface bracket;
 each of the interface brackets connecting to either a first top beam or a second top beam; and
 a plurality of triangular rafter frames connected to said top beam by respective connector brackets.

2. The disassemblable roof framing structure of claim 1 wherein:
 each of the attachment brackets is comprised of a bottom cover, a top cover, and an existing frame connecting plate mechanically fastened to the existing frame.

3. The disassemblable roof framing structure of claim 1 wherein:
 the rafter frames are comprised of generally scalene triangular shapes so as to impart a slope on two sides of the roof wherein one of said two sides of the roof is longer than the other of said two sides of the roof.

4. The disassemblable roof framing structure of claim 1 wherein:
 a frame connecting plate further comprising a pair of oppositely placed connector members holding a connection bracket.

5. A method of assembly of the disassemblable roof framing structure of claim 1 comprising the steps of:
 a) connecting the existing frame connecting plate to the top cover;
 b) connecting the existing frame connecting plate to the existing frame;
 c) using a bottom cover and lag bolts to connect the transverse beam to the existing frame;

d) extending each extension member to adjust the width and placing the vertical stud into each attachment bracket;
e) connecting the interface brackets to the top of the studs;
f) connecting the interface brackets to the top beam;
g) connecting the rafter connector brackets to the top beam and the rafter frames; and
h) putting a tarp over the rafter frames.

* * * * *